United States Patent
Lindsey

[15] 3,704,407
[45] Nov. 28, 1972

[54] GYRO SERVO CONTROL SYSTEM & STRUCTURE

[72] Inventor: James M. Lindsey, Houston, Tex.

[73] Assignee: Sperry Sun Well Surveying Company, Sugar Land, Tex.

[22] Filed: Nov. 21, 1969

[21] Appl. No.: 879,007

[52] U.S. Cl. .................318/648, 318/671, 318/684, 318/689, 74/5.4, 74/5.6
[51] Int. Cl. ..............................................B64c 17/02
[58] Field of Search......318/599, 648, 649, 671, 659, 318/684, 689; 74/5.4, 5.6

[56] References Cited

UNITED STATES PATENTS

| | | | |
|---|---|---|---|
| 2,683,247 | 7/1954 | Wiley | 318/648 |
| 2,419,063 | 4/1947 | Fischer | 318/649 X |
| 2,466,055 | 4/1949 | Sierer, Jr. | 318/599 X |
| 2,488,734 | 11/1949 | Mueller | 318/689 X |
| 2,698,542 | 1/1955 | Fisher-Luttrelle et al. | 318/648 X |
| 3,068,385 | 12/1962 | Galbraith | 318/689 X |
| 3,375,421 | 3/1968 | VeNard | 318/689 |

*Primary Examiner*—T. E. Lynch
*Attorney*—George L. Church, Donald R. Johnson, Wilmer E. McCorquodale, Jr. and John E. Holder

[57] ABSTRACT

In a system for controlling the tilt of a rotor on a gyro, a sensing device for detecting tilt, together with electrical circuit components for providing an error signal are mounted upon the rotor housing. The error signal, which is transmitted by the circuits supplying power to the gyro rotor, is supplied to a control system which in turn provides a signal to a torqueing motor. The torque motor is continuously operated, and normally rotates in a first direction unless a signal is received from the sensing device, which detects tilt in only one direction, whereupon the torque motor is reversed to apply a corrective force to the gyro system. Use of the power supply path to transmit the error signal obviates the use of any friction-producing physical attachment with the components of the gyro in order to transmit such error signal to the torque motor control system.

12 Claims, 5 Drawing Figures

INVENTOR
JAMES M. LINDSEY
ATTORNEY

INVENTOR
JAMES M. LINDSEY

*John E. Holder*

ATTORNEY

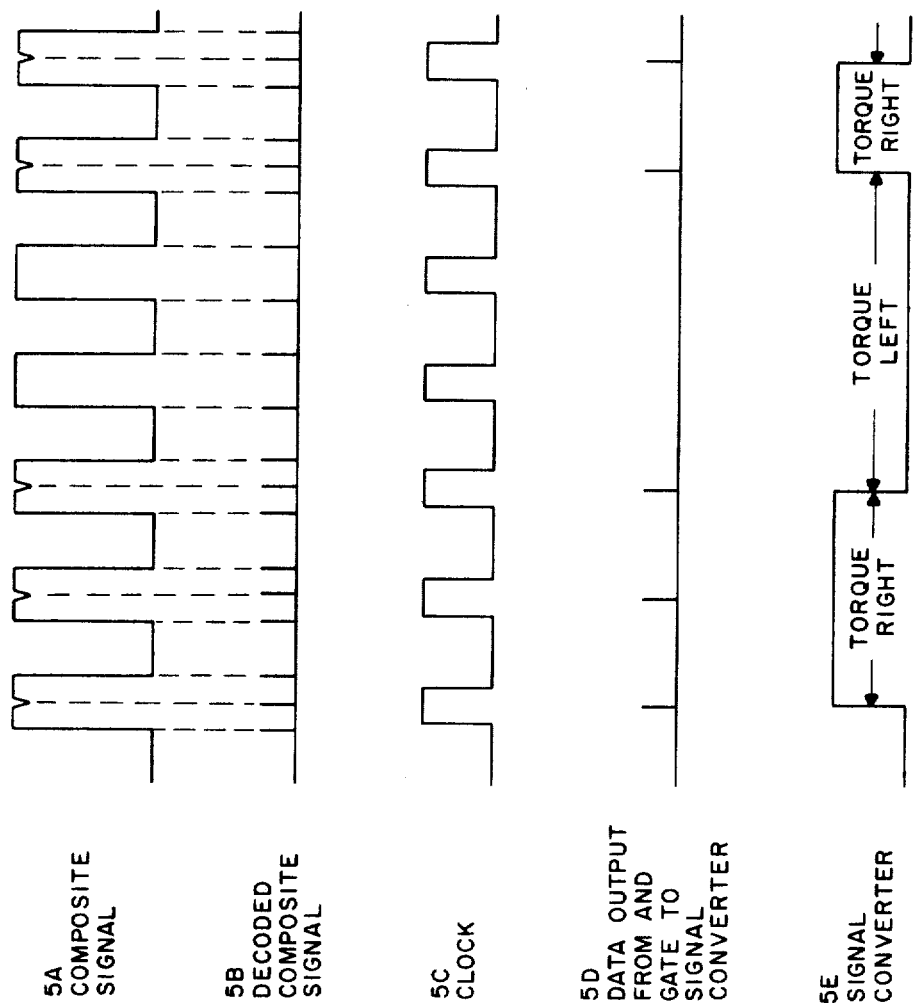

GYRO SERVO CONTROL SYSTEM & STRUCTURE

BACKGROUND OF THE INVENTION

This invention relates to a gyro control, and more particularly, to a system for maintaining the rotor of a gyro in a predetermined attitude. A similar gyro control system is set forth in applicant's copending United States application Ser. No. 879,006. In a typical gyro control system, some sort of physical attachment is necessary in order to detect gyro tilt and transmit the indication of such tilt to a restoring device. A torque motor is normally used to apply a torqueing force to the vertical axis of the gyro in order to correct tilt of the inner gimbal or rotary housing. Although slip rings and the like, which have been used in the past for such purposes, minimize the amount of external torque or force upon the gyro components, slip rings or any other type of physical attachment to the vertical or horizontal components of a gyro are undesirable because they do cause friction to some degree, which creates drift and tilt in the gyro. It is therefore desirable to find a means of electrically transferring a control signal from these components, which signal is indicative of the tilt of the components, to the control function or in the present case, a torque motor. The torque motor then exerts the necessary force on the vertical axis of the gyro to maintain the rotor axis in some desired positional relationship. By placing detection circuitry on the gyro rotor housing, the tilt may be detected and transmitted to a control function; however, the amount and size of circuit components must be minimized in order to limit unbalancing forces on the gyro housing.

It is therefore an object of the present invention to provide a new and improved gyro control system for correcting the problems set forth above.

SUMMARY OF THE INVENTION

With this and other objects in view, the present invention contemplates a gyro control system responsive to a position indicating device. Circuitry in the system develops a control signal in response to a position change, which signal in turn is superimposed upon a power supply signal for transmittal to a control function. The control function is normally operated in a first mode to continuously control the gyro accordingly. However, upon detecting a position change, the control function is reversed until the control signal indicative of condition change is eliminated, whereupon the control function returns to its normal operating condition. In a gyro system, the control function is typically a torque motor which applies torque to an axis of the gyro, which in turn causes the rotor to precess to a desired position.

A complete understanding of this invention may be had by reference to the following detailed description, when read in conjunction with the accompanying drawings illustrating embodiments thereof.

DESCRIPTION OF THE DRAWINGS

FIG. 5 is a diagrammatic representation of control signals at various points within the system.

DESCRIPTION OF THE PREFERRED EMBODIMENTS

Figure 1:
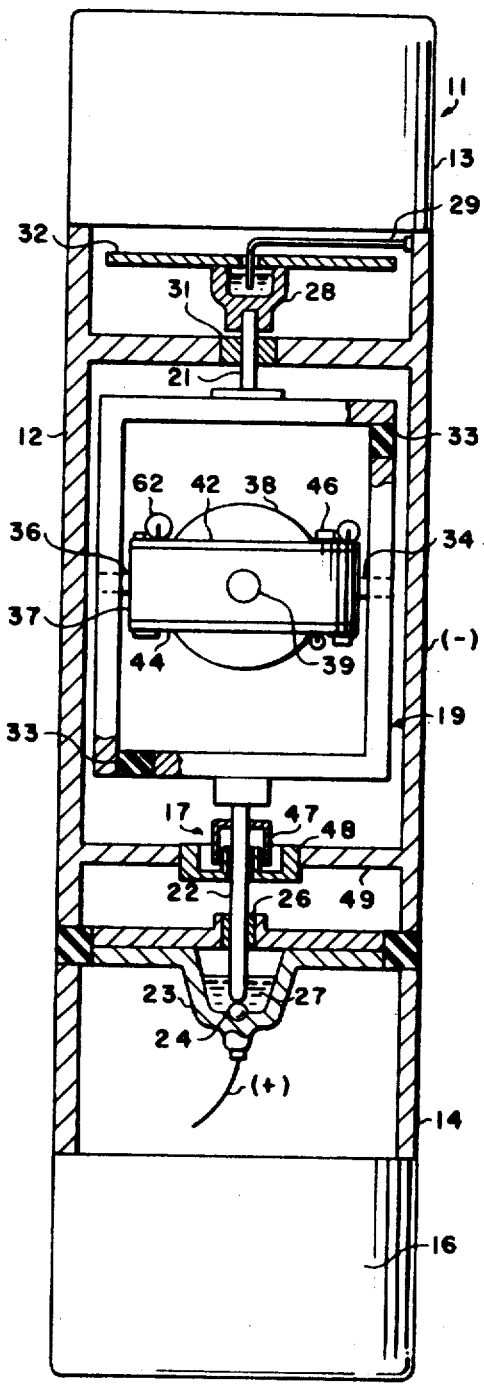
FIG. 1 is a partial cross-sectional view of a wellbore instrument embodying a gyro control system in accordance with the present invention.

Referring first to FIG. 1 of the drawings, a wellbore tool 11 is shown having a housing 12 for encasing a gyro instrument. A photographic recording apparatus or the like may be mounted in a section 13 above the gyro for making readings indicative of the gyro position. Alternatively, circuitry may be provided for transmitting a signal to the surface, which signal provides an instantaneous recording representing the gyro position. Below the instrument section is a power supply or inverter unit 14, and circuitry 16 for controlling the operation of the torqueing motor 17 attached to a vertical shaft of the gyro. The outer gimbal 19 of the gyro has upwardly and downwardly extending vertical shafts 21, 22 respectively, which in turn are supported by bearings for rotation within the instrument housing. At the lower end of the lower vertical shaft 22, a cup 23 is provided within the housing for receiving the lower end of the shaft 22. A ball 24 is positioned between the lower end of the shaft and the bottom of the cup to furnish a pivotal support for the shaft. Annular bearings 26 are positioned about the shaft for support in a horizontal direction. The cup 23 is filled with mercury or some such conducting fluid 27, so that an electrical current applied to the bottom of the cup is transmitted by means of the conducting fluid to the vertical shaft 22 of the gyro. At the upper end of the gyro, the upwardly extending vertical shaft 21 likewise has a mercury filled cup 28, mounted thereon. A wiper wire 29 extends inwardly from the wall of the housing 12, and is bent to extend downwardly into the mercury filled cup 28 to form a second conducting path to the gyro. The upper shaft 21 is supported in a horizontal direction by annular bearings 31. An instrument face 32 may be connected to the upper end of the cup or shaft to provide indications of the gyro position. Photographic apparatus in section 13 is used to record the position of the instrument face. The vertical shafts 21, 22 are in electrical communication with the outer gimbal of the gyro. Insulating member 33 are positioned in the gimbal walls so that the gimbal is divided into two separate conducting paths. These conducting paths in turn are in communication with opposed horizontal shafts 34, 36 which are received within opposed walls of the outer gimbal and which extend inwardly to support an inner gimbal 37 of the gyro. The inner gimbal of the gyro is pivotally mounted on such horizontal shafts 34, 36, nd supported a rotor (not shown) within a rotor housing 38. The rotor is mounted about another horizontal shaft 39 perpendicular to the shafts 34, 36 of the inner gimbal. AS is well known in the construction of such gyro instruments, the inner gimbal 37 is divided into separate insulated portions similarly to the outer gimbal, which portions provide separate conducting paths from the shafts 34, 36 to the rotor for supplying power to the rotor.

Circuit boards 42, 44 are mounted on the top and bottom sides respectively of the inner gimbal 37. The circuit boards have cut out portions for permitting the rotor in the gyro to extend therethrough. Electrical circuit devices 46 which will be described hereinafter with respect to FIG. 2 of the drawings, are physically mounted on the circuit boards. The circuit devices mounted on the boards include a tilt detector, which in conjunction with the other circuit devices provide a signal indicative of the tilt of the rotor. The signal is fed to the torqueing motor 17 shown mounted about the downwardly extending vertical shaft 22 of the outer gimbal. The torqueing motor is comprised of a rotor 47 which is attached to the vertical shaft, and a stater winding 48, which is positioned on a mounting 49 extending within the instrument housing.

As has been described with respect to the Background Of The Invention, it is seen that it is desirable to maintain the rotor housing in either a true horizontal position relative to earth, or in some fixed position with respect to the vertical or outer gimbal. It is first necessary to detect any changes in the attitude of the inner gimbal with respect to such fixed or desired position in order to make corrections, through a torqueing motor system, for such changes.

Figure 4:
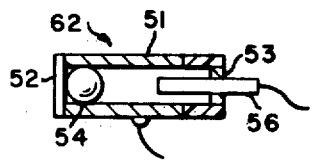
FIG. 4 shows a cross-sectional view of a level detector for use with the control system of the present invention.

Referring next to FIG. 4 of the drawings, a position or tilt sensing device 62 is shown for detecting such changes in the attitude of the inner gimbal. The tilt detecting device consists of a hollow cylinder 51 having closed end walls 52, 53. The outer peripheral walls of the cylinder are made of an electrically conducting material which is insulated from the end wall 53. A ball 54, likewise made of conducting material is positioned within the cylinder, and is free of roll within the cylinder. A conducting rod 56 extends through the end wall 53 of the cylinder into its interior bore. This rod limits the freedom of movement of the ball in the cylinder. The rod is connected to a wire which, in conjunction with electrical circuitry, provides a means for opening and closing a conductive path comprised of the rod, the ball, and the wall of the cylinder itself. As viewed in FIG. 4, it is readily seen that if the cylinder were to tilt in the right hand direction, the ball would roll into contact with the end of the rod 56 to provide an electrical conducting path between the rod and the wall of the cylinder. The use of this tilt detecting device in conjunction with the control system described herein will be set forth in greater detail with respect to the circuit diagrams.

Figure 2:
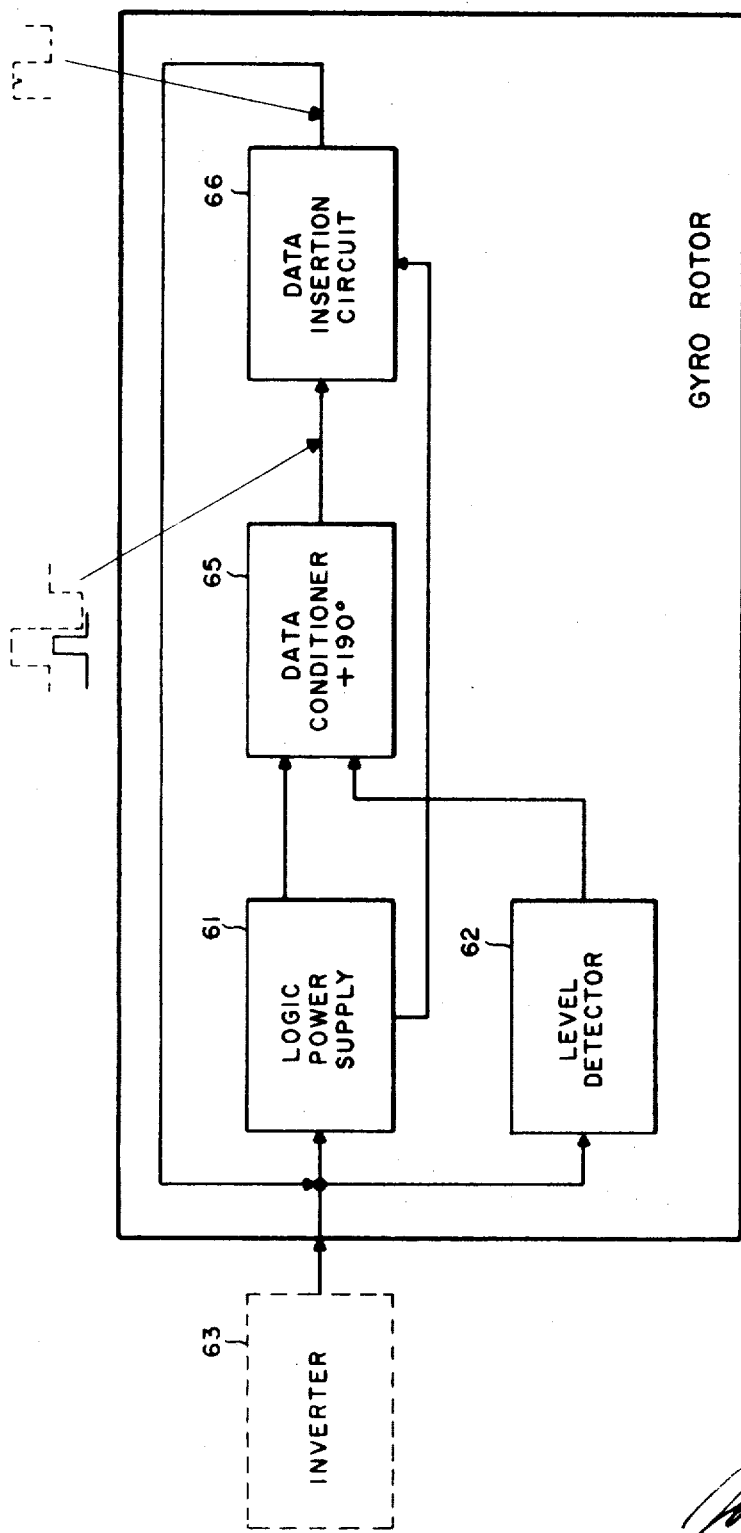
FIG. 2 is a schematic circuit diagram of electronic circuitry mounted on the gyro rotor described with respect to FIG. 1.

Referring next to FIG. 2 of the drawings, the electrical circuitry portion of the system, which is mounted upon the circuit boards 42, 44 on the rotor housing is shown enclosed by a heavy line. The circuit consists of a logic power supply 61 for furnishing DC power to the components of the system mounted on the rotor. In addition, the level detector 62, such as shown in FIG. 4, provides means for passing a signal from an inverter 63 to a data conditioner and data insertion circuit. The above circuitry transforms the signal indicative of tilt into a control function, which applied back to the inverter signal is used for controlling a torque motor.

The inverter 63 supplies a 1,200 cycle square wave signal for driving the gyro rotor. The inverter signal is applied to the rotor in the manner described above by means of separate insulated sections of the gimbal housing for providing current paths. Since the square wave signal is available to the rotor, the signal is easily furnished to the circuitry mounted on the circuit boards, which in turn are positioned on the rotor housing. The circuit boards are made of a phenolic, plastic, glass, or other such insulating material, and leads extending from the integrated components connect with small wires on the boards, which in turn are connected to the separate insulated portions of the rotor housing.

Referring again to FIG. 2, the inverter 63 is shown providing a signal to the rotor which is represented by the heavy line in FIG. 2. Such inverter signal is applied first to the logic power supply 61, which in turn generates a DC voltage for driving the components of the system. In addition, the inverter signal is fed to level detector 62, which has been described with respect to FIG. 4. Although the rotor has been described herein as being operated by a square wave signal, the system can, with modification, be used when the rotor is driven by a DC voltage. Again, although the system will be described herein as maintaining the rotor in a true horizontal position, it is readily seen that the rotor could be maintained in any desirable position with a tilt detector or the like being determinative of the movement of such rotor housing from that desired position. The level detector 62, which is mounted on the rotor can be any of a number of devices having the capability of detecting tilt, and may be either of a variable impedence configuration, or a straight on-off type switch of the single pole, single-throw configuration as shown in FIG. 4. In the switch in FIG. 4, the conducting cylinder 51 provides a conducting path which is tied to ground. If the rotor tilts in the right-hand direction, it grounds the switch.

The switch or level detector 62 is connected to one side of a data conditioner circuit 63. The other side of the data conditioner network is connected to a drive signal that originates in the inverter. The data conditioner 63 is comprised of a series of monostable flip flops (one shots) that cause the pulse to occur in a timed relationship with the positive 90° portion of the square wave signal received from the inverter. The data conditioner network receives the square wave signal from the level detector. As the inverter signal goes positive, a first one shot in the data conditioner conducts for the first 90° of the signal. The output of this one shot drives a second one shot within the network that conducts for a 10 microsecond period. Thus, the resultant output of the data conditioner circuit is a 10 microsecond pulse that occurs in a timed relationship with the plus 90° portion of the inverter signal. In FIG. 2, a diagrammatic representation of the signal appear near the output line from the data conditioner block. The dotted line represents the time phase of the square wave from the inverter. The solid lines represent the ten microsecond signal which is generated by the data conditioner and its timed relation with the inverter signal. Thus the data conditioner 63 provides a 10 microsecond pulse in coincidence with the positive 90° position of the square wave from the inverter. This pulse is used to saturate a transistor in a data insertion circuit 66 that has, as its collector load, a capacitor in series with the with the inverter signal line. When the transistor saturates, it puts a spike or pulse on the square wave at the time it goes into saturation or in this case, at the positive 90° portion of the inverter signal. Should the level detector 62 be in a neutral position so as to not provide a conducting path to the data conditioner network 63, then no pulse will be superimposed upon the square wave inverter signal. In either event, the occurrence of a pulse on the inverter signal indicates that the rotor is tilting in a direction from its desired position. If the pulses appear upon the square wave, then the rotor is tilting in the one direction; if the pulses are not appearing on the square wave, then it is assumed that the rotor is tilting in an opposite direction. The important thing is that the signal which is superimposed upon the gyro rotor power line is now available in the inverter section of the tool where it can easily be processed for controlling the torqueing motor. By utilizing a system for detecting tilt in only one direction and assuming tilt in the other direction in the absence of such detection, the amount of circuit components on the rotor housing can be substantially reduced thus reducing the unbalancing forces affecting the rotor housing.

Figure 3:
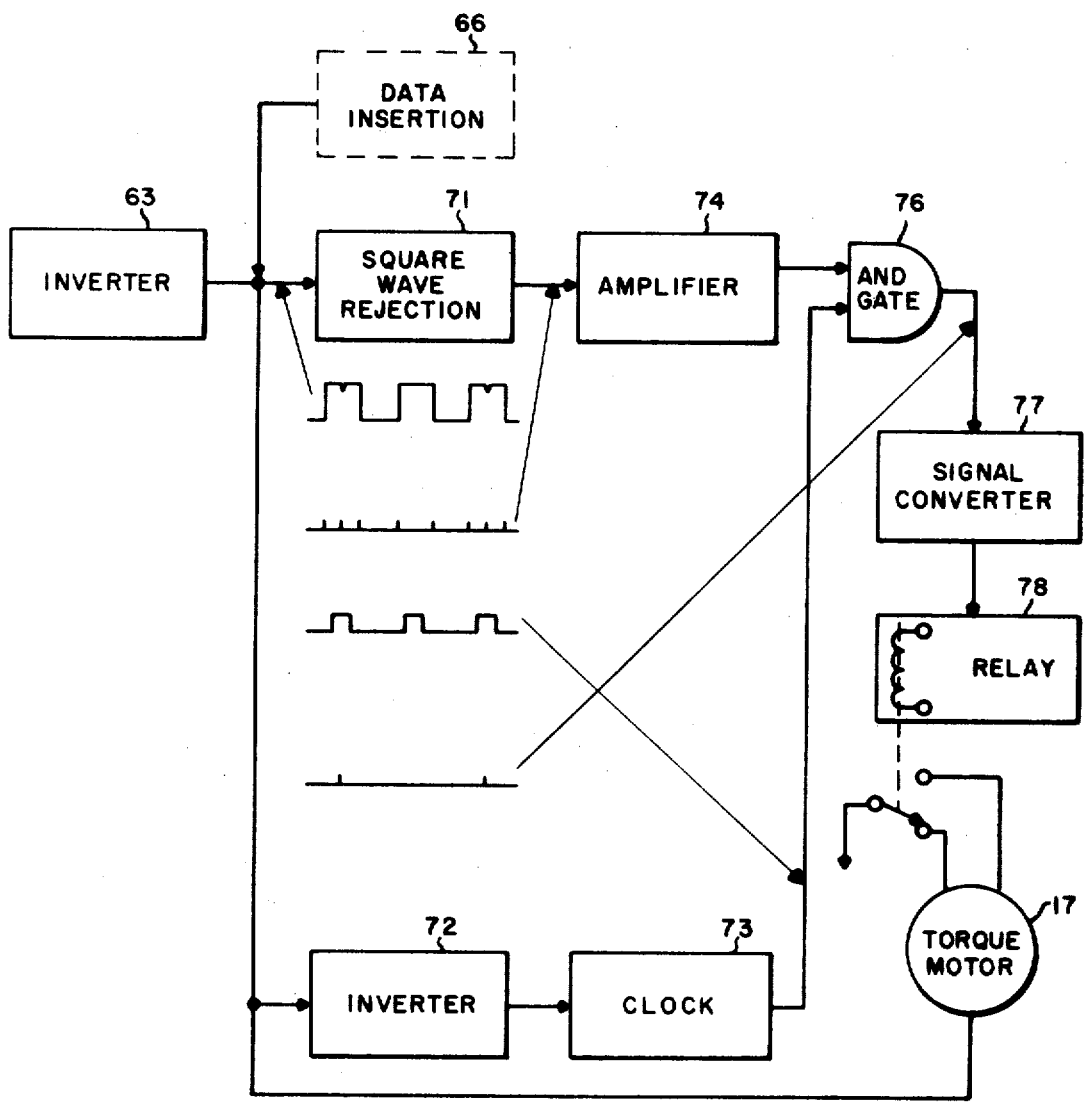
FIG. 3 is a circuit diagram of electrical circuitry for operating a control function external of the gyro rotor.

Referring next to FIG. 3 of the drawings, a torque motor control circuit is shown which is physically located in the inverter or circuitry section of the tool, below the gyro instrument section. A square wave rejection circuit 71, is comprised of a transformer in conjunction with a capacitor, which develops a square wave that is 180° out of phase with the source inverter square wave, and adds the two together. The resulting signal output of the square wave rejection circuit is comprised only of the data signal or pulse that is superimposed upon the square wave, together with a transient spike that occurs during the fast rise and decay of the square wave resulting in a series of spikes, as shown schematically in FIG. 3 and in FIG. 5B of the drawings. These data pulses are in corresponding timed relationship with their location upon the inverter signal, the latter being shown schematically in FIG. 3 with respect to the input line to the rejection circuit 71 from the inverter and also in FIG. 5A. The appearance of the transient spikes in the output of the rejection circuit 71 can be alleviated by the use of a sine wave for driving the gyro system, however, the square wave offers a more efficient means of operation of the system, and requires less components to be placed on the rotor housing.

The remaining portion of a torque motor control circuitry, as shown in FIG. 3, functions to compare the output signal of the square wave rejection circuit with the inverter square wave to determined when data signals occur on the inverter wave. The circuitry then functions to separate the data signal for use in controlling the torque motor to drive the motor in a direction opposite that in which it is normally driven. The wave forms which result from the circuitry of FIG. 3 are compared in FIG. 5 of the drawings. In conjunction with the square wave rejection circuit 71, a clock inverter 72 receives the square wave from the gyro inverter 63 and inverts such square wave so that the negative going portion of the gyro's square wave from the inverter 63. The output signal of the inverter 72 is then fed to the clock circuit 73 which is comprised of a series of monostable multivibrators or one shots. The negative input from the inverter 72 generates a positive output in a first monostable multivibrator, the duration of which is controlled by an RC time constant. For example, the duration of such an output may correspond to a 20° duration of the inverter square wave. Such output from the first monostable multivibrator is then fed to a second monostable multivibrator, which again conducts when a negative output is received from the first one shot, with the second one shot output being positive again for a duration controlled by an RC time constant. The duration of the output from the second monostable multivibrator may be on the order of a signal corresponding in timed relation with the 45° to 135° portion of the positive going gyro inverter square wave. The resulting signal from the clock circuit therefore is a square wave which is shorter in duration than the inverter 63 square wave, and which occurs in the central portion of the time duration of the gyro inverter square wave as for example between the 45° to 135° portion of the wave.

The output of the clock circuit is shown diagrammatically in FIGS. 3 and 5C relative to the composite signal and the decoded composite signal. The output of the clock circuit is fed to an AND gate 76 while another signal to the AND gate is provided by the data conditioner 74 which amplified the decoded composite signal from the square wave rejection circuit 71 for use in operating the AND gate 76. When a spike occurs upon the decoded composite signal which is in coincidence with the positive going duration of the wave from the clock circuit, the AND gate conducts to provide a signal to the signal converter 77. Such a period of coincidence occurs only when a data spike appears on the decoded composite signal wherein the transient spikes caused by the rise and fall of the inverter signal do not occur in coincidence with the shortened positive signal (45°–135°) appearing from the clock circuit.

The signal converter 77 converts the signal on the square wave to DC voltage and remains as a positive DC until it sees no pulse on the positive going portion of the square wave, whereupon it ceases to generate a DC voltage. The output of the signal converter is shown in FIG. 5E of the drawings. The positive DC voltage from the signal converter operates a relay 78 which in turn drives the torque motor 17 in a direction opposite to that which it is continuously driving in the absence of a positive going signal from the signal converter. As shown in FIG. 5E for purposes of explanation, the signal from the signal converter appears as a positive going portion or a torque right portion of the wave, and when the data signal fails to appear on the positive going portion of the inverter square wave, the circuitry of FIG. 3 fails to supply a signal from the signal converter. Thus, the DC voltage ceases and permits the torque motor to operate in its normal direction. This latter portion of the signal in 5E is labeled as torque left. Again, when a data signal appears on the composite signal 5A an output signal is received from the signal converter to operate the relay and thereby drive the torque motor in a torque right condition.

In the operation of the circuit of FIG. 3 described above in conjunction with the foregoing circuits and apparatus, the level detector 62 is moved on tilt of the innver gimbal 37 about its horizontal axis. Tilt of the level detector for example, in a right hand direction will close a circuit path to permit a signal from the inverter 63 to be passed to the data conditioner 65. During this condition, data conditioner 65 will generate a 10 microsecond pulse as the time corresponding to the positive 90° portion of the inverter square wave. This pulse from the data conditioner triggers the data insertion circuit to place a pulse on the inverter line at such corresponding timed relationship. The pulse is thus combined with the inverter signal and passed from the rotor housing through the rotor power supply path to control circuitry external of the rotor housing. The combined signal is passed to the square wave rejection circuit as shown in FIG. 3 wherein the square wave is depressed to leave only the superimposed pulse and transient pulses which are sent to the AND gate 76 through an amplifier 74. This signal, together with a short duration signal from the clock circuit filters out the transient pulse and causes the AND gate 76 to conduct only upon the occurrence of a pulse on the positive going portion of the square wave to thereby operate a signal converter circuit 77. The signal converter circuit 77 in turn generages a positive DC signal during the occurrence of such pulses on the positive going portion of the square wave, which DC signal operates a relay 78 to cause the torque motor to operate in a condition or direction of rotation opposite that to its normal condition of operation.

It is readily seen that other gateing type circuits could be used to provide a signal which is superimposed upon the inverter signal. Likewise, the circuitry for decoding the superimposed signal and then recombining them to drive the motor in an opposite direction is also subject to equivalent embodiments. Therefore, while particular embodiments of the present invention have been shown and described, it is apparent that changes and modifications may e made without departing from this invention in its broader aspects, and therefore, the aim in the above description is to cover all such changes and modifications as fall within the true spirit and scope of this invention.

What is claimed is:

1. In a gyro tilt control system, means for transferring a control signal from the rotor housing of the gyro to a control function exterior to the rotor housing, which means comprises: means on said rotor housing for detecting tilt in a first direction; means on said rotor housing for generating a control signal in response to the detected tilt; means for providing a power signal to the rotor, said power signal and control signal being carried over a common circuit path; means on said rotor housing for superimposing said control signal upon the power signal; means exterior of said rotor housing for deciding said superimposing control signal to provide a usable control signal; means normally operating the control function in a first mode; and means responsive to said control signal for operating the control function in a second mode.

2. The apparatus of claim 1 wherein the control function includes a torque motor responsive to said control signal for applying a precessing force to an axis of the gyro.

3. In a gyro control system for controlling a torque motor for regulating the tilt of a gyro rotor relative to a predetermined attitude: circuit means for supplying a power signal to a rotor motor on a gyro housing; means on said rotor for sensing a change in a first direction of the attitude of the rotor relative to the predetermined attitude; circuit means for detecting said sensed changed and for generating an error signal in response thereto; circuit means for superimposing said error signal on the power signal to form a combined signal for transmission over a common circuit path; means for rejecting the power signal component of said combined signal to provide a control signal for operating said torque motor in a first direction; and means normally operating the torque motor in a second direction.

4. In a gyro control system for controlling the tilt of a gyro rotor relative to a predetermined attitude: circuit means for supplying a power signal to a rotor motor on a gyro housing; means on said rotor for sensing a change in the attitude of the rotor relative to the predetermined attitude; circuit means for detecting said sensed change and for generating an error signal in response thereto; circuit means for superimposing said error signal on the power signal to form a combined signal; a reversible motor for applying a torque to the vertical axis of the gyro, said reversible motor being driven in a first direction in the absence of an error signal and driven in a second direction when an error signal is generated; control means exterior of said housing for operating said reversible motor; and circuit means for transmitting said combined signal from said gyro housing to said control means exterior of said housing.

5. The apparatus of claim 4 wherein said circuit means for transmitting said combined signal to said control means is the same as the circuit means for supplying the power signal to the rotor motor.

6. In a control system, means for detecting a parameter and transmitting an indication of such parameter over a single circuit path to a control function, which means comprises: means for providing a square wave input signal on the circuit path; means for generating a data pulse in response to the detected parameter; means for superimposing said data pulse on said input signal in a timed relationship with said input signal to from a combined signal; means for substantially rejecting said input signal to leave a data pulse and transient pulses corresponding to the rise and fall of said square wave input signal; means for relating said data signal to the timed relationship at which said data signal was superimposed upon said input signal and for rejecting said transient pulses; and means responsive to said data signal for driving a control function.

7. The apparatus of claim 6 wherein said square wave input signal is a power supply signal for operating the system.

8. The apparatus of claim 6 wherein said control function is operated in a first mode in the absence of a data pulse being generated and operated in a second mode when a data pulse is generated.

9. The apparatus of claim 8 wherein said means for generating a data pulse is a series of monostable flip flops that cause a pulse to occur in timed relationship with said input signal.

10. The apparatus of claim 8 wherein said superimposing means is a transistor which has a capacitor as its collector load, which capacitor is coupled to the input signal.

11. The apparatus of claim 8 wherein said relating and rejecting means includes gate means operable in response to the data pulse and the input signal for generating a control signal to operate the control function.

12. The apparatus of claim 11 and further including a signal converter operable in response to said control signal for generating a direct current signal for operating the control function.

* * * * *